US007861685B2

(12) United States Patent
Sono et al.

(10) Patent No.: US 7,861,685 B2
(45) Date of Patent: Jan. 4, 2011

(54) DIRECT FUEL INJECTION DIESEL ENGINE

(75) Inventors: Hiroshi Sono, Wako (JP); Nobuhiko Sasaki, Wako (JP); Tatsuya Uchimoto, Wako (JP); Kenichiro Ikeya, Wako (JP); Yutaka Tajima, Wako (JP); Mitsuhiro Shibata, Wako (JP); Yukihisa Yamaya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 12/307,215

(22) PCT Filed: Jun. 7, 2007

(86) PCT No.: PCT/JP2007/061531

§ 371 (c)(1),
(2), (4) Date: Dec. 31, 2008

(87) PCT Pub. No.: WO2008/004398

PCT Pub. Date: Jan. 10, 2008

(65) Prior Publication Data

US 2009/0314253 A1    Dec. 24, 2009

(30) Foreign Application Priority Data

Jul. 4, 2006    (JP)    ............................. 2006-184088

(51) Int. Cl.
*F02F 3/24*    (2006.01)
(52) U.S. Cl. ........................................ 123/298; 123/307
(58) Field of Classification Search ................. 123/276, 123/298, 301, 307, 193.6, 279
See application file for complete search history.

(56) References Cited

U.S. PATENT DOCUMENTS 4,733,642 A * 3/1988 Ishida ........................ 123/276

| 5,215,052 | A | * | 6/1993 | Augustin | 123/276 |
| 6,513,487 | B1 | * | 2/2003 | Jorach et al. | 123/299 |
| 6,553,960 | B1 | * | 4/2003 | Yoshikawa et al. | 123/299 |
| 6,644,267 | B2 | * | 11/2003 | Wuerfel | 123/298 |

(Continued)

FOREIGN PATENT DOCUMENTS

| DE | 102 60 938 A 1 | 7/2003 |
| JP | 62-52232 U | 4/1987 |
| JP | 62-255524 A | 11/1987 |
| JP | 63-16124 A | 1/1988 |
| JP | 8-296442 A | 11/1996 |

(Continued)

*Primary Examiner*—Hai H Huynh
(74) *Attorney, Agent, or Firm*—Arent Fox LLP

(57) ABSTRACT

In a direct fuel injection diesel engine equipped with a pentroof-shaped piston, a collision angle ($\alpha$) at which fuel injected in a direction in which the height of the top face of a piston (13) is high collides with a cavity (25) is set larger than a collision angle ($\beta$) at which fuel injected in a direction in which the height of the top face of the piston (13) is low collides with the cavity (25). By so doing, in a direction in which the height of the top face is high fuel that has collided with the cavity (25) easily rebounds upward, thus achieving effective combustion by mixing with a large amount of air present in the vicinity of the opening of the cavity (25) where the height is high, and in a direction in which the height of the top face is low it is difficult for fuel that has collided with the cavity (25) to rebound upward, thus achieving effective combustion by suppressing the flowing out of fuel or flame from the opening of the cavity (25) where the height is low, thereby appropriately mixing fuel and air in all directions in the circumferential direction of the cavity and making it possible to improve the engine output and reduce harmful exhaust substances.

9 Claims, 8 Drawing Sheets

U.S. PATENT DOCUMENTS

| | | | |
|---|---|---|---|
| 6,644,268 B2* | 11/2003 | Konig et al. | 123/299 |
| 6,840,209 B2* | 1/2005 | Shimazaki | 123/276 |
| 6,854,438 B2* | 2/2005 | Hilger et al. | 123/260 |
| 7,011,070 B2* | 3/2006 | Hill et al. | 123/298 |
| 7,040,279 B2* | 5/2006 | Regueiro | 123/254 |
| 7,143,738 B2* | 12/2006 | Ganz et al. | 123/295 |
| 7,156,069 B2* | 1/2007 | Ono et al. | 123/276 |
| 7,213,564 B2* | 5/2007 | Hill et al. | 123/298 |
| 7,441,535 B2* | 10/2008 | Yuzaki et al. | 123/276 |
| 7,513,238 B2* | 4/2009 | Pfaff et al. | 123/276 |
| 2004/0154580 A1* | 8/2004 | Eismark et al. | 123/276 |
| 2005/0115538 A1* | 6/2005 | Ono et al. | 123/276 |
| 2005/0224606 A1* | 10/2005 | Dingle | 239/533.2 |
| 2009/0217905 A1* | 9/2009 | Tanaka et al. | 123/276 |
| 2010/0006061 A1* | 1/2010 | Shibata et al. | 123/307 |
| 2010/0147260 A1* | 6/2010 | Yamaguchi et al. | 123/276 |

FOREIGN PATENT DOCUMENTS

| | | |
|---|---|---|
| JP | 2002-122024 A | 4/2002 |
| JP | 2003-502550 A | 1/2003 |
| JP | 2004-270476 A | 9/2004 |
| WO | WO 2007/148467 A1 | 12/2007 |
| WO | WO 2008/001534 A1 | 1/2008 |

* cited by examiner

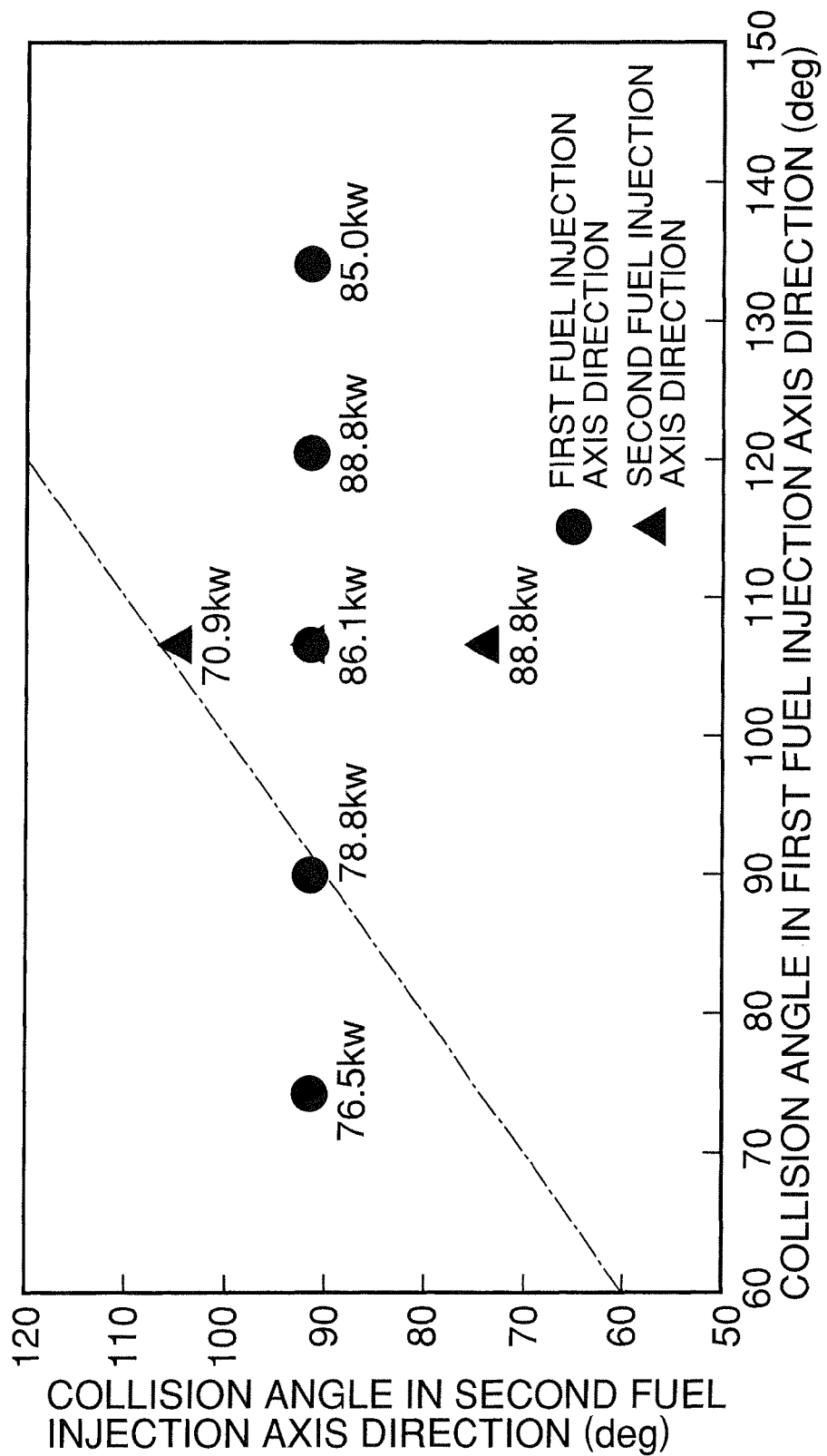

DIRECT FUEL INJECTION DIESEL ENGINE

CROSS-REFERENCE TO RELATED APPLICATION

This application is a National Stage entry of International Application No. PCT/JP2007/061531, filed Jun. 7, 2007, the entire specification claims and drawings of which are incorporated herewith by reference.

TECHNICAL FIELD

The present invention relates to a direct fuel injection diesel engine that includes a piston of which the height of a top face changes in the circumferential direction, and a fuel injector for injecting fuel oriented toward a plurality of positions in the circumferential direction of the interior of a cavity recessed in a central part of the piston.

BACKGROUND ART

In general, the top face of a piston of a direct fuel injection diesel engine is formed as a flat face, but a direct fuel injection diesel engine for which the top face of a piston projects in a pentroof shape is known from Patent Publication 1 below.

With regard to this direct fuel injection diesel engine, since the height of a peripheral wall portion of a cavity recessed in the top face of the pentroof-shaped piston changes in the circumferential direction, a vertical injection direction of fuel from a fuel injector is set according to the height of the peripheral wall portion, thus preventing flame from escaping from the cavity. Specifically, when the peripheral wall portion is low the direction of injection is set low, and when the peripheral wall portion is high the direction of injection is set high.

The peripheral wall portion of the cavity is a cylindrical face parallel to the piston central axis, fuel injected from the fuel injector at different angles of injection collides with the peripheral wall portion of the cavity on the cylindrical face, and the collision angle at which the injected fuel collides with the peripheral wall portion of the cavity (angle formed on opening side of cavity by fuel injection axis and tangent to cavity at collision point) is determined only by the angle of injection of fuel.

Patent Publication 1: Japanese Utility Model Registration Application Laid-open No. 62-52232

DISCLOSURE OF INVENTION

Problems to Be Solved by the Invention

In a direct fuel injection diesel engine equipped with a pentroof-shaped piston, if an angle formed relative to the piston central axis by the peripheral wall portion of the cavity with which fuel injected from the fuel injector collides is uniform in the circumferential direction, since the angle formed by the top face of the piston and the peripheral wall portion of the cavity decreases as the height of the top face of the piston decreases, there is a possibility that this will cause differences in the shape of a flow path for gas in and out of the cavity and the mixing of fuel and air will become nonuniform.

Changing the angle of the peripheral wall portion of the cavity in the circumferential direction could be considered, but when the peripheral wall portion of the cavity is inclined so as to narrow the opening of the cavity, there is the problem that the extremity (lip portion) of the opening edge of the cavity thus narrowed becomes thin, and the thermal load becomes high, Furthermore, since it becomes difficult for fuel to flow out to the exterior of the cavity due to the lip portion, there is the problem that air outside the cavity cannot be utilized effectively. Because of this, inclining the peripheral wall portion of the cavity in a direction in which the opening of the cavity is enlarged as the height of the top face of the piston decreases could be considered.

When fuel collides with the peripheral wall portion of the cavity, which is a cylindrical face, since the collision angle becomes an acute angle, and it is easy for fuel that has rebounded to remain in the bottom wall portion of the cavity, there is the problem that the fuel cannot be mixed effectively with air present on the opening side of the cavity. In order for fuel to rebound toward the opening side of the cavity by making the fuel collision angle obtuse, and utilize air present on the opening side of the cavity effectively, making fuel collide with a curved wall portion connected to a lower part of the cylindrical peripheral wall portion of the cavity could be considered.

However, when the angle of the peripheral wall portion of the cavity relative to the piston central axis is changed in the circumferential direction, or when fuel is made to collide with the curved wall portion of the cavity, the fuel collision angle is determined not only by the angle of injection, but is also dependent on the angle of the peripheral wall portion of the cavity relative to the piston central axis or the degree of curvature of the curved wall portion of the cavity. In this case, in contrast to the above-mentioned case, when the fuel collision angle becomes excessive, fuel rebounds strongly toward the opening side of the cavity, and fuel or flame easily flows out from the cavity, thus giving rise to the problem of an increase in smoke or, accompanying this, degradation in the engine output.

That is, when the angle of the peripheral wall portion of the cavity relative to the piston central axis is changed in the circumferential direction or when fuel is made to collide with the curved wall portion of the cavity, by only setting the direction of injection low when the peripheral wall portion is low and the direction of injection high when the peripheral wall portion is high as described in Patent Publication 1 above, it is impossible to appropriately mix fuel and air in all directions in the circumferential direction of the cavity.

The present invention has been accomplished in the light of the above-mentioned circumstances, and it is an object thereof to enable appropriate mixing of fuel and air in all directions in the circumferential direction of a cavity in a direct fuel injection diesel engine equipped with a pentroof-shaped piston.

Means for Solving the Problems

In order to attain the above object, according to a first aspect of the present invention, there is provided a direct fuel injection diesel engine comprising a piston of which the height of a top face changes in the circumferential direction, and a fuel injector for injecting fuel oriented in a plurality of directions in the circumferential direction of the interior of a cavity recessed in a central part of the piston, characterized in that a peripheral wall portion of the cavity in a direction in which the height of the top face of the piston is low is inclined so as to open radially outward, and a collision angle at which fuel injected in a direction in which the height of the top face of the piston is high collides with the cavity is set larger than a collision angle at which fuel injected in a direction in which the height of the top face of the piston is low collides with the cavity.

According to a second aspect of the present invention, there is provided a direct fuel injection diesel engine comprising a piston of which the height of a top face changes in the circumferential direction, and a fuel injector for injecting fuel oriented toward a plurality of positions in the circumferential direction of the interior of a cavity recessed in a central part of the piston, characterized in that at least one of the plurality of positions is present on a curved wall portion connecting a peripheral wall portion and a bottom wall portion of the cavity, and a collision angle at which fuel injected in a direction in which the height of the top face of the piston is high collides with the cavity is set larger than a collision angle at which fuel injected in a direction in which the height of the top face of the piston is low collides with the cavity.

According to a third aspect of the present invention, in addition to any one of the first or second aspect, angles formed by the plurality of fuel injection directions of the fuel injector relative to a piston central axis are equal.

According to a fourth aspect of the present invention, in addition to any one of the first to third aspects, a minimum value of the fuel collision angle in the plurality of positions is smaller than 90°.

According to a fifth aspect of the present invention, in addition to any one of the first to fourth aspects, a maximum value of the fuel collision angle in the plurality of positions is greater than 90°.

Effects of the Invention

In accordance with the first aspect of the present invention, since the collision angle at which fuel injected in a direction in which the height of the top face of the piston is high collides with the cavity is set larger than the collision angle at which fuel injected in a direction in which the height of the top face of the piston is low collides with the cavity, in a direction in which the height of the top face is high fuel that has collided with the cavity easily rebounds upward, thus achieving effective combustion by mixing with a large amount of air present in the vicinity of the opening of the cavity where the height is high, and in a direction in which the height of the top face is low it is difficult for fuel that has collided with the cavity to rebound upward, thus achieving effective combustion by suppressing the flowing out of fuel or flame from the opening of the cavity where the height is low, thereby making it possible to improve the engine output and reduce harmful exhaust substances. Moreover, since the peripheral wall portion of the cavity in a direction in which the height of the top face of the piston is low is inclined so as to open radially outward, it is possible to prevent a portion, connected to the opening of the cavity, of the upper end of the peripheral wall portion from becoming a thin lip shape, thus reducing the thermal load.

Furthermore, in accordance with the second aspect of the present invention, since the collision angle at which fuel injected in a direction in which the height of the top face of the piston is high collides with the cavity is set larger than the collision angle at which fuel injected in a direction in which the height of the top face of the piston is low collides with the cavity, in a direction in which the height of the top face is high fuel that has collided with the cavity easily rebounds upward, thus achieving effective combustion by mixing with a large amount of air present in the vicinity of the opening of the cavity where the height is high, and in a direction in which the height of the top face is low it is difficult for fuel that has collided with the cavity to rebound upward, thus achieving effective combustion by suppressing the flowing out of fuel or flame from the opening of the cavity where the height is low, thereby making it possible to improve the engine output and reduce harmful exhaust substances. Moreover, since at least one of the plurality of positions at which fuel injected from the fuel injector collides is present on the curved wall portion, which connects the peripheral wall portion of the cavity and the bottom wall portion, the collision angle can easily be set merely by changing the shape of the curved wall portion.

Moreover, in accordance with the third aspect of the present invention, since the angles formed by the plurality of directions of injection of fuel by the fuel injector relative to the piston central axis are set so as to be equal, it is possible to simplify the structure of the fuel injector, thus contributing to a reduction in cost.

Furthermore, in accordance with the fourth aspect of the present invention, by setting the fuel collision angle at any of the positions of the cavity at which fuel injected from the fuel injector collides so as to be less than 90°, it is possible to make fuel that has collided rebound toward the bottom part of the cavity, thus suppressing the flowing out of a gas mixture or flame from the opening of the cavity and achieving effective combustion of the gas mixture.

Moreover, in accordance with the fifth aspect of the present invention, by setting the fuel collision angle at any of the positions of the cavity at which fuel injected from the fuel injector collides so as to be greater than 90°, it is possible to make fuel that has collided rebound toward the opening of the cavity, thus achieving effective combustion by mixing it effectively with air in the vicinity of the opening.

BRIEF DESCRIPTION OF DRAWINGS

FIG. 8 is a graph showing the correlation between engine output and the relationship in size between two fuel collision angles (first embodiment).

EXPLANATION OF REFERENCE NUMERALS AND SYMBOLS

13 Piston
23 Fuel injector
25 Cavity
25a Peripheral wall portion
25b Curved wall portion
25c Bottom wall portion
α Collision angle
β Collision angle
Lp Piston central axis

BEST MODE FOR CARRYING OUT THE INVENTION

A mode for carrying out the present invention is explained below by reference to the attached drawings.

Embodiment 1

FIG. 1 to FIG. 8 show an embodiment of the present invention.

Figure 1:
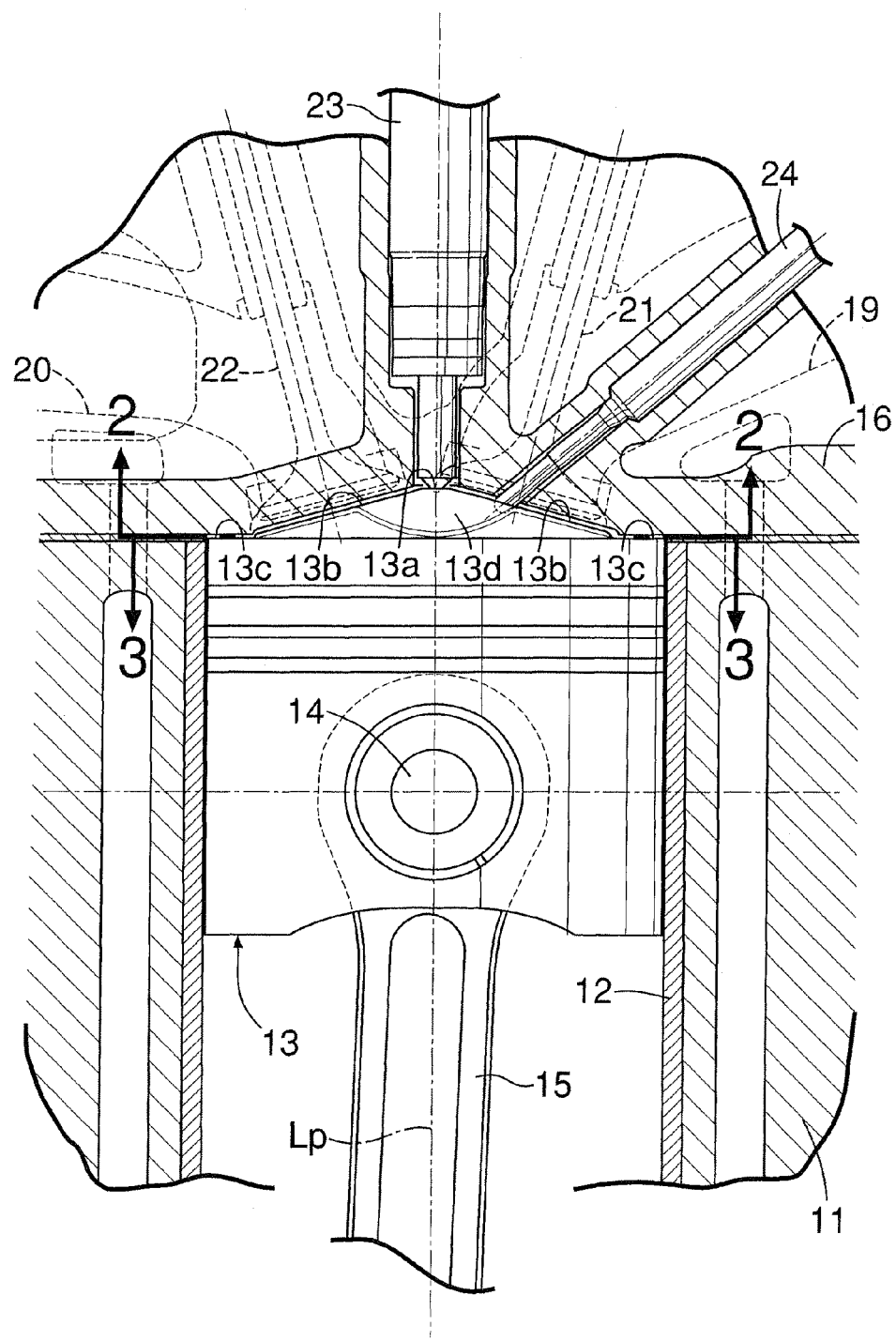
FIG. 1 is a vertical sectional view of an essential part of a diesel engine (first embodiment).
Figure 2:
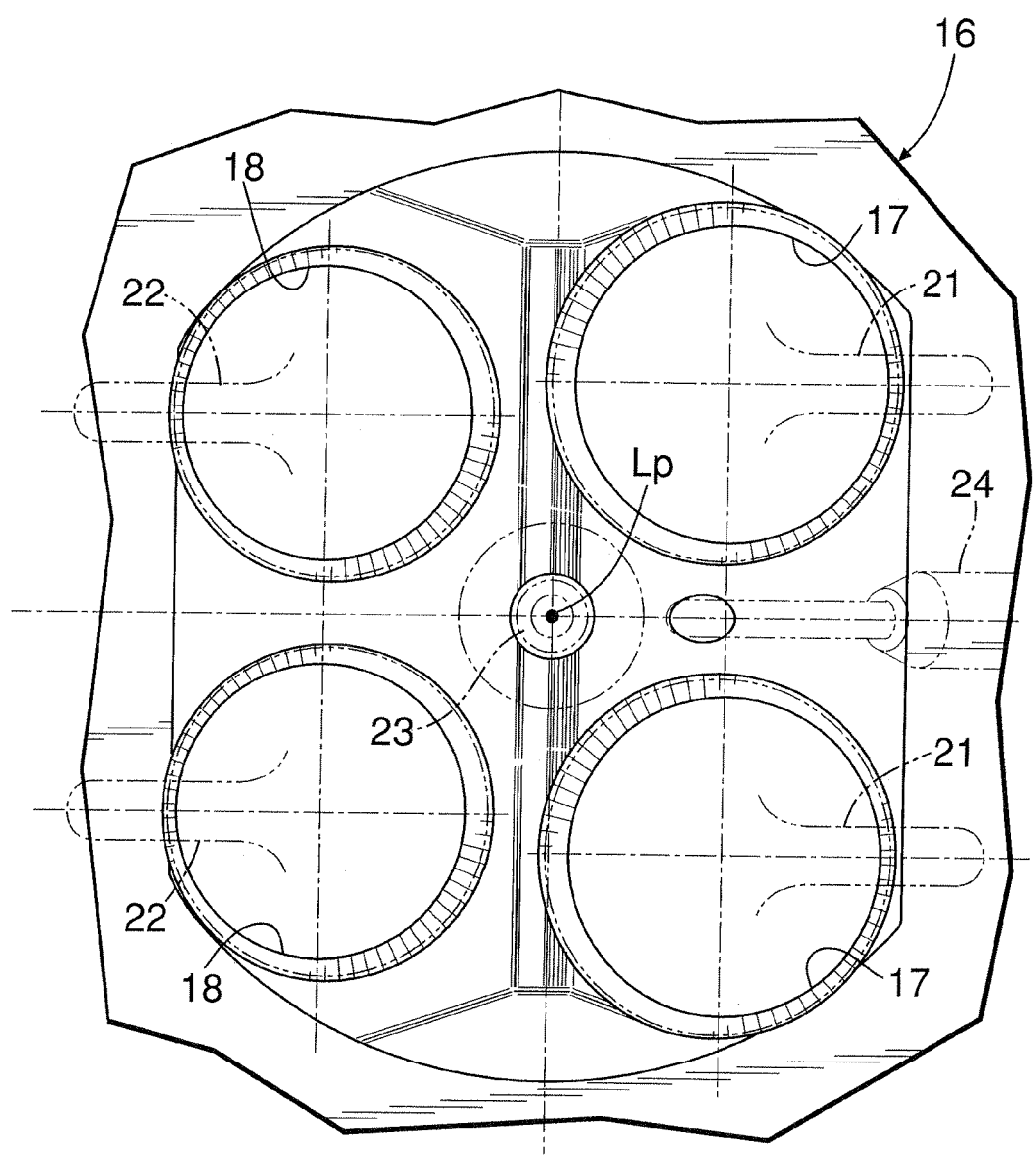
FIG. 2 is a view from arrowed line 2-2 in FIG. 1 (first embodiment).
Figure 3:
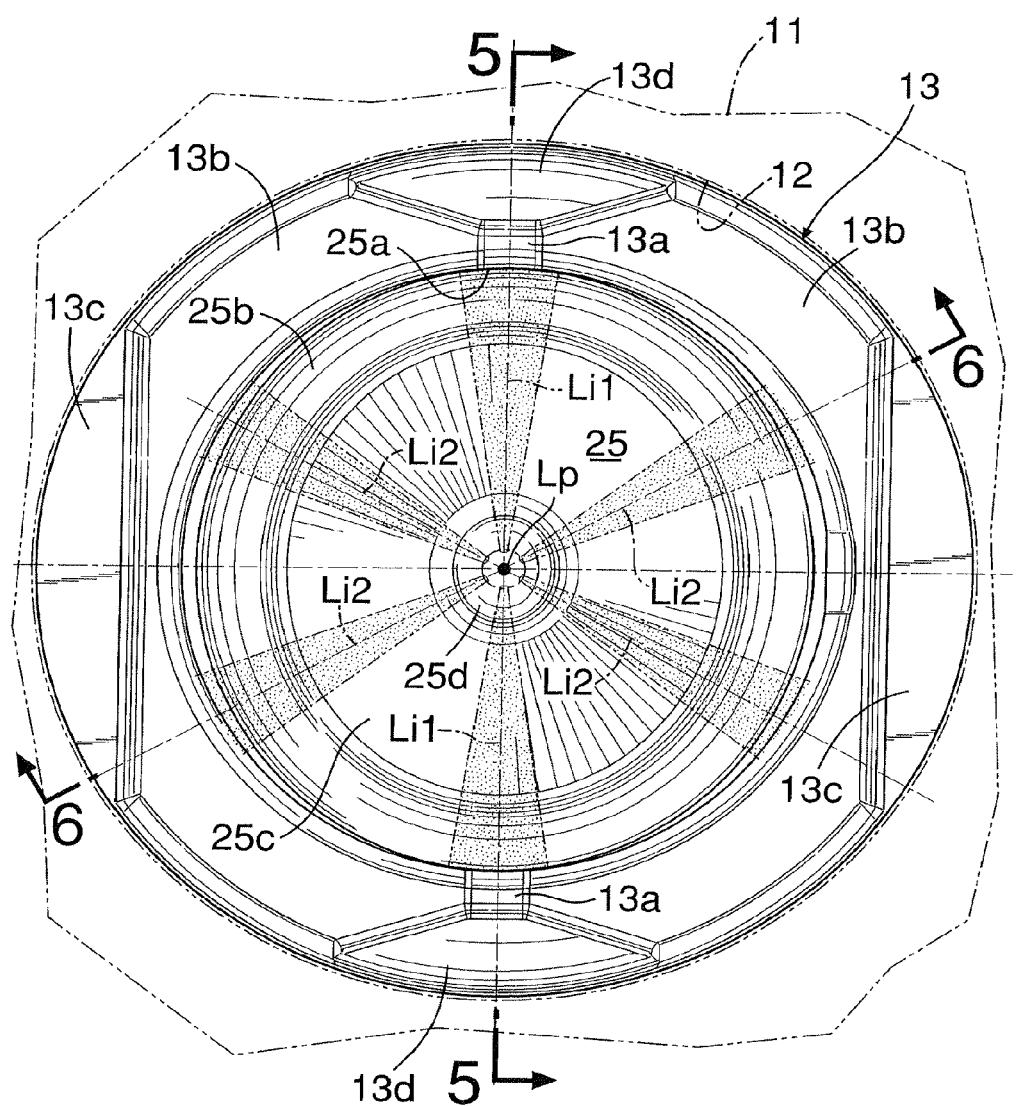
FIG. 3 is a view from arrowed line 3-3 in FIG. 1 (first embodiment).

As shown in FIG. 1 to FIG. 3, a direct fuel injection type diesel engine includes a piston 13 slidably fitted into a cylinder 12 formed in a cylinder block 11, and the piston 13 is connected to a crankshaft (not illustrated) via a piston pin 14 and a connecting rod 15, Two intake valve holes 17 and 17 and two exhaust valve holes 18 and 18 facing a top face of the piston 13 open in a lower face of a cylinder head 16, which is joined to an upper face of the cylinder block 11, an intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is provided so as to be positioned on a piston central axis Lp, and a glow plug 24 is provided so as to be adjacent to the fuel injector 23.

Figure 4:
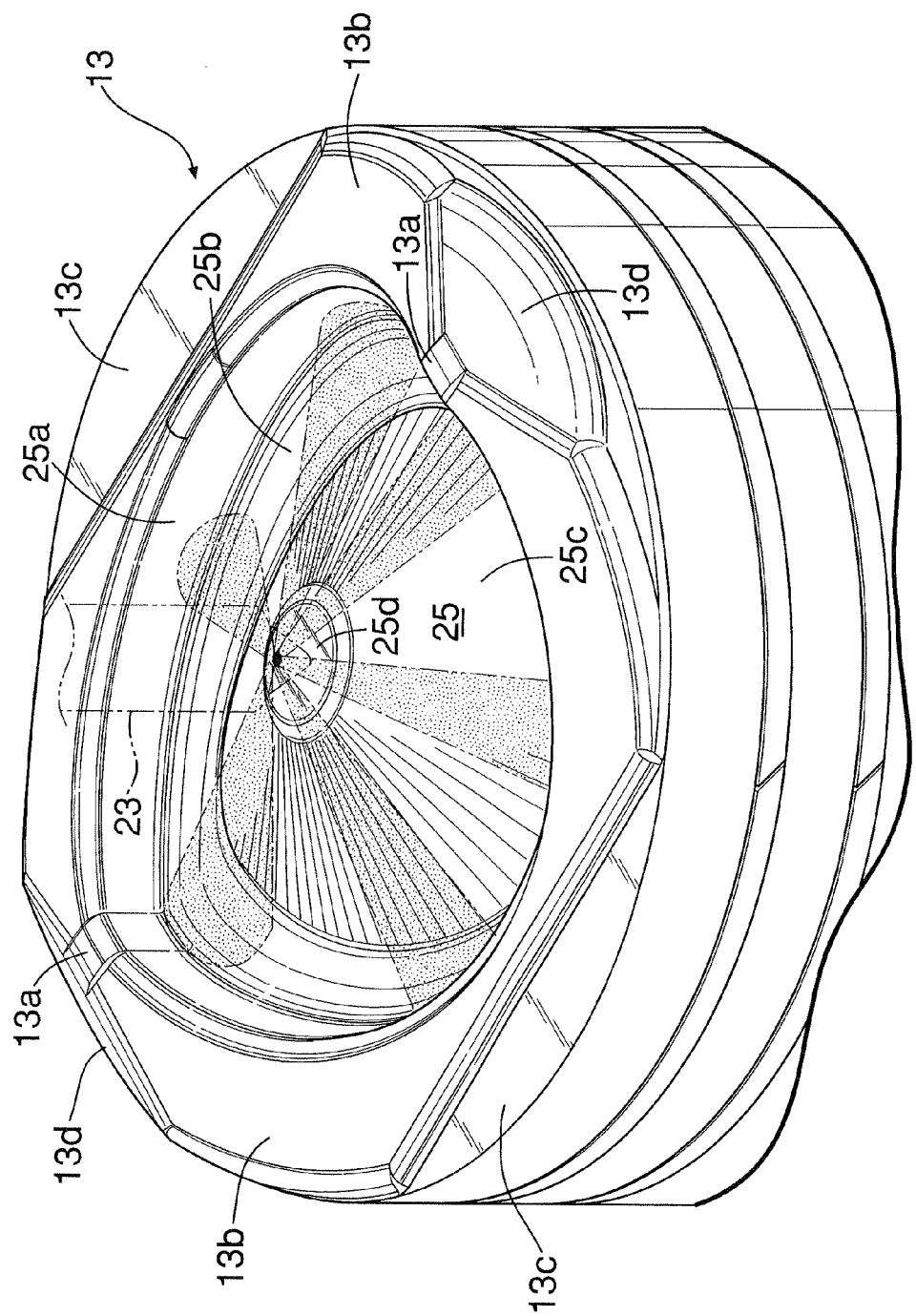
FIG. 4 is a perspective view of an upper part of a piston (first embodiment).

As is clear from FIG. 1 and FIG. 4, the top face of the piston 13 and the lower face of the cylinder head 16 facing it are not flat but are inclined in a pentroof shape with a triangular cross-section, and due to this shape it is possible to reduce the degree of curvature of the intake port 19 and the exhaust port 20, guarantee a diameter for the intake valve holes 17 and 17 and the exhaust valve holes 18 and 18, and enhance the intake efficiency and the exhaust efficiency.

A cavity 25 with the piston central axis Lp as its center is recessed in the top face of the piston 13. Formed radially outside the cavity 25 are a pair of inclined faces 13b and 13b inclined downward to the intake side and the exhaust side from top portions 13a and 13a extending linearly parallel to the piston pin 14, a pair of flat faces 13c and 13c formed in the vicinity of the lower end of the inclined faces 13b and 13b so as to be perpendicular to the piston central axis Lp, and a pair of cutout portions 13d and 13d formed by cutting out opposite ends of the top portions 13a and 13a in a curved shape.

The fuel injector 23 disposed along the piston central axis Lp injects fuel in six directions spaced at intervals of 60° in the circumferential direction with one point on the piston central axis Lp, as a center. Among six fuel injection axes, two first fuel injection axes Li1 are parallel to the piston pin 14 direction when viewed in the piston central axis Lp direction, and the other four second fuel injection axes Li2 are inclined at 60° relative to the piston pin 14 direction. Furthermore, when viewed from a direction perpendicular to the piston central axis Lp, the six first and second fuel injection axes Li1 and Li2 are inclined obliquely downward, and a fuel injection angle (cone angle) is set at a constant angle of 120° for all of the first and second fuel injection axes Li1 and Li2 (see FIG. 5 and FIG. 6).

Figure 5:
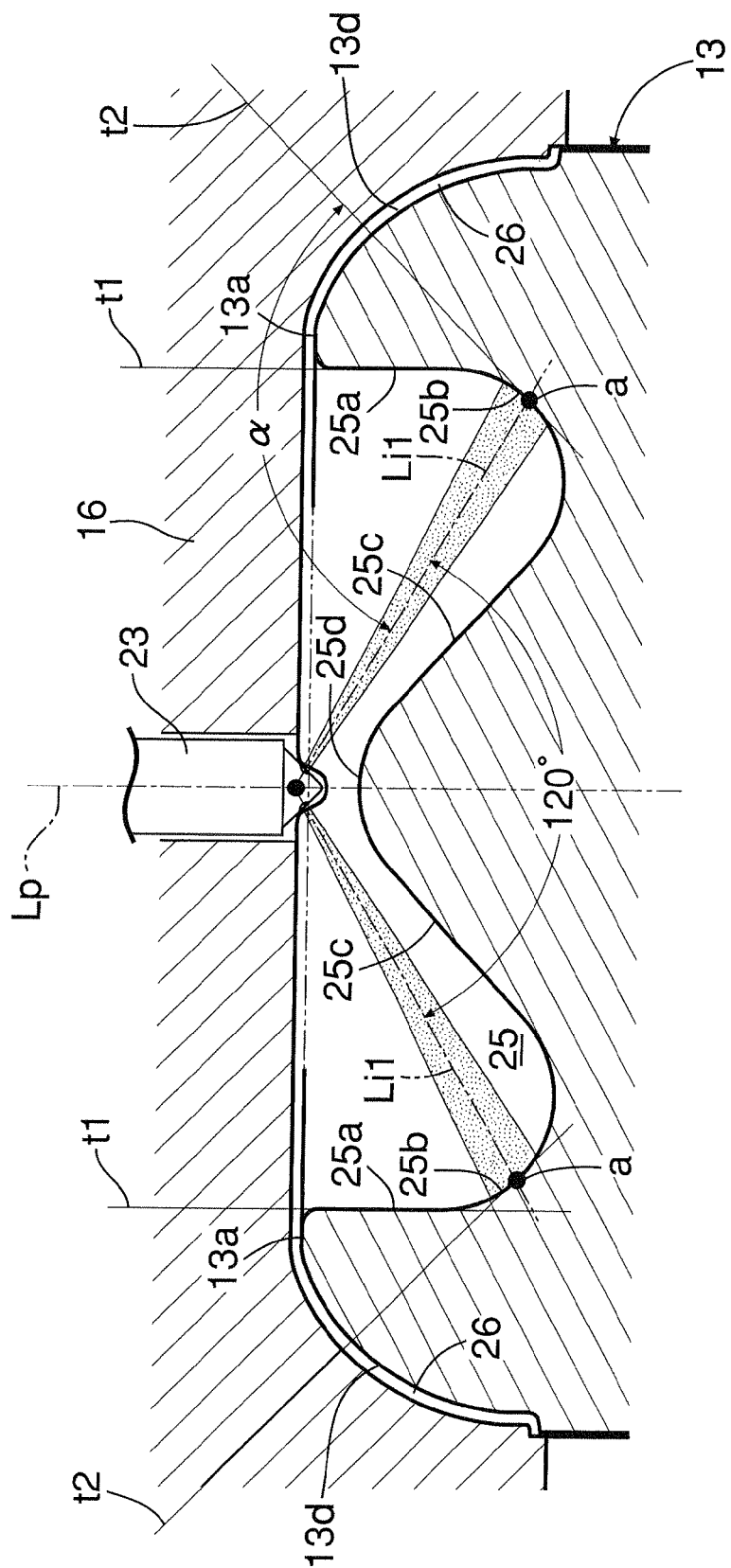
FIG. 5 is a sectional view along line 5-5 in FIG. 3 (first embodiment).

FIG. 5 is a vertical section of the piston 13 in a direction along the piston pin 14, that is, a direction along the first fuel injection axis Li1 of the fuel injector 23. At this cross-sectional position, the piston 13 is sectioned along the linear top portions 13a and 13a, which are at the highest position of the top face, and the cutout portions 13d and 13d, which are inclined downward, are formed at opposite ends of the top portions 13a and 13a. A squish area 26 is formed between the lower face of the cylinder head 16 and the top portions 13a and 13a and cutout portions 13d and 13d.

The cavity 25 formed with the piston central axis Lp as a center is formed from a peripheral wall portion 25a extending linearly downward along the piston central axis Lp from the top face of the piston 13, a curved wall portion 25b curving in a concave shape from the lower end of the peripheral wall portion 25a toward the piston central axis Lp, a bottom wall portion 25c extending linearly obliquely upward from the radially inner end of the curved wall portion 25b toward the piston central axis Lp, and on the piston central axis Lp a top wall portion 25d curving upward in a convex shape so as to be connected to the radially inner end of the bottom wall portion 25c. A direction t1 of the peripheral wall portion 25a at this cross-sectional position is parallel to the piston central axis Lp.

In FIG. 5, the first fuel injection axis Li1 is oriented toward the curved wall portion 25b of the cavity 25, and an angle formed by a tangent t2 extending upward from a collision point a where fuel injected on the first fuel injection axis Li1 collides with the curved wall portion 25b and the first fuel injection axis Li1 are defined as a collision angle α. In the present embodiment, the collision angle a is set at an obtuse angle of 106.7°.

Figure 6:
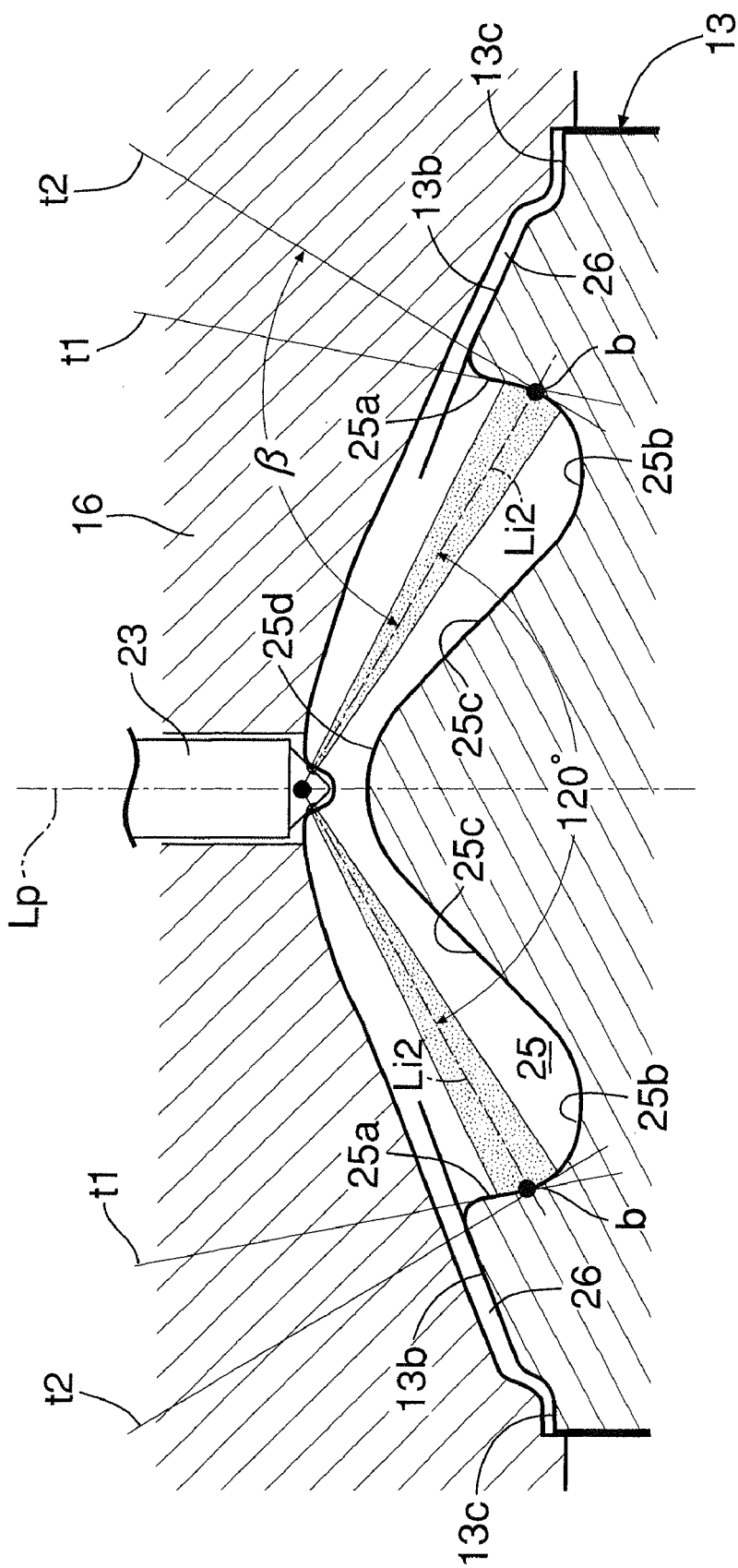
FIG. 6 is a sectional view along line 6-6 in FIG. 3 (first embodiment).

FIG. 6 is a vertical section of the piston 13 in a direction displaced by 60° from the direction along the piston pin 14, that is, a direction along the second fuel injection axis Li2 of the fuel injector 23. At this cross-sectional position, the top face of the piston 13 is sectioned along the inclined faces 13b and 13b and the flat faces 13c and 13c, which are at positions lower than in FIG. 5 above. A squish area 26 is formed between the lower face of the cylinder head 16 and the inclined faces 13b and 13b and flat faces 13c and 13c. In addition, a cross-section in which the top face of the piston 13 is the lowest is a cross-section in a direction perpendicular to the piston pin 14, but there is no fuel injection axis at this cross-sectional position.

In the cross-sectional position of FIG. 6, since the top face of the piston 13 is low, the shape of the cavity 25 is different. Compared with the cross-sectional position in FIG. 5, the shape of the top wall portion 25d and the shape of the bottom wall portion 25c are the same, but the shape of the curved wall portion 25b is different, and the peripheral wall portion 25a extending upward from the curved wall portion 25b is not parallel to the piston central axis Lp but is inclined radially outward. That is, in cross-sections other than the cross-section (see FIG. 5) that is parallel to the piston pin 14 where the top face of the piston 13 is the highest, the direction t1 of the peripheral wall portion 25a of the cavity 25 opens radially outward toward the opening thereabove.

The second fuel injection axis Li2 is oriented toward the curved wall portion 25b of the cavity 25, and an angle formed by the tangent t2 extending upward from a collision point b where fuel injected on the second fuel injection axis Li2 collides with the curved wall portion 25b and the second fuel injection axis Li2 is defined as a collision angle β. In the present embodiment, the collision angle β is set at 91.6°, which is substantially a right angle.

Positioning the collision points a and b on the curved wall portion 25b connecting the peripheral wall portion 25a and the bottom wall portion 25c of the cavity 25 enables the collision angles α and β to be easily set by changing only the shape of the curved wall portion 25b. Furthermore, since the peripheral wall portion 25a of the cavity 25 in a direction in which the height of the top face of the piston 13 is low is inclined so as to open radially outward, it is possible to prevent a portion, connected to the opening of the cavity 25, of the upper end of the peripheral wall portion 25a from becoming a thin lip shape, thus reducing the thermal load.

As hereinbefore described, in a cross-section (see FIG. 5) that is parallel to the piston pin 14, in which the top face of the piston 13 is the highest, the fuel collision angle α (106.7°) is set large, and in a cross-section (see FIG. 6) that is inclined relative to the piston pin 14, in which the top face of the piston 13 is lower than the above, the fuel collision angle β (91.6°) is set smaller than the collision angle α.

Figure 7:
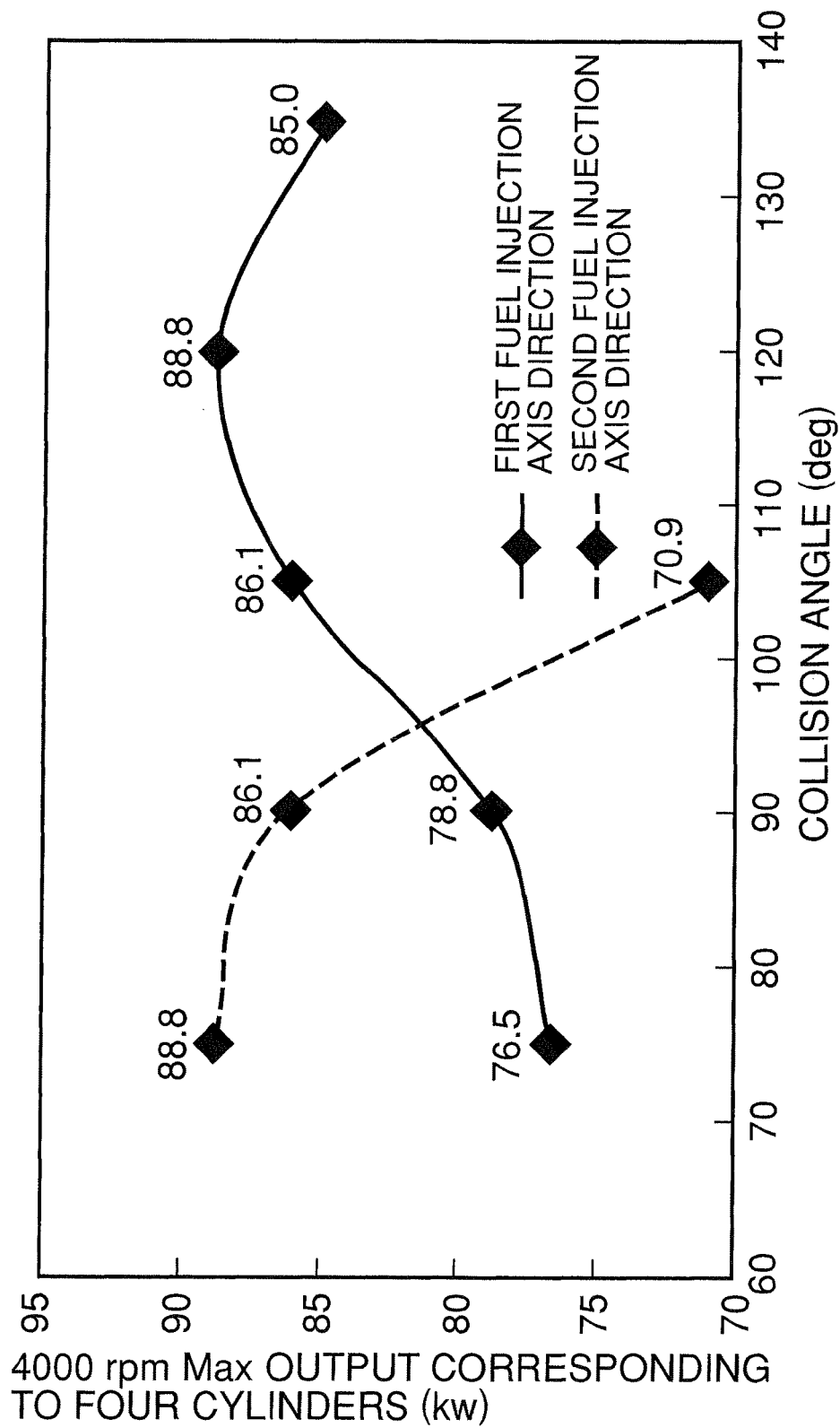
FIG. 7 is a graph showing the correlation between fuel collision angle and engine output (first embodiment).

In the graph of FIG. 7, the abscissa denotes a fuel collision angle, and the ordinate denotes maximum output of a single cylinder engine at 4000 rpm converted to be equivalent to four cylinders. The solid line corresponds to the cross-section (see FIG. 5) parallel to the piston pin 14, in which the top face of the piston 13 is the highest, and the engine output becomes a maximum in the vicinity of a collision angle α of 120°. The broken line corresponds to the cross-section (see FIG. 6) that is inclined at 60° relative to the piston pin 14, in which the top face of the piston 13 is lower than the above, and the engine output becomes a maximum in the vicinity of a collision angle β of 75°.

In the graph of FIG. 8, the graph of FIG. 7 is converted so that the abscissa denotes a collision angle α and the ordinate denotes a collision angle β. The chain line is a line where collision angle α=collision angle β, and in a region below the line, that is, α>β, it can be seen that a maximum engine output of 88.8 kw is obtained.

From the graph of FIG. 7, it can be seen that it is desirable that, in a direction in which the height of the top face of the piston 13 is high, the fuel collision angle α is larger than 90° (obtuse angle), and in a direction in which the height of the top face of the piston 13 is low the fuel collision angle β is smaller than 90° (acute angle), and if set in this way it is possible to improve the engine output effectively.

The reason that the engine output improves by setting the fuel collision angle α, in a direction in which the height of the top face of the piston 13 is high, at an obtuse angle is surmised to be as follows. That is, in a direction in which the height of the top face of the piston 13 is high, the cavity 25 becomes deep, fuel injected from the fuel injector 23 collides with a deep position of the cavity 25 and easily accumulates in the bottom part of the cavity 25, and air present in the vicinity of the opening of the cavity 25 does not mix sufficiently with fuel, thus not contributing effectively to combustion. As in the present embodiment, by setting the fuel collision angle α in a direction in which the height of the top face of the piston 13 is high so that the angle is obtuse, much of the fuel that has collided with the curved wall portion 25b of the cavity 25 at the collision point a rebounds upward toward the opening of the cavity 25 and mixes well with air present in the vicinity of the opening of the cavity 25, thus efficiently carrying out combustion.

Furthermore, the reason that the engine output improves by setting the fuel collision angle β, in a direction in which the height of the top face of the piston 13 is low, so that the angle is acute is surmised to be as follows. That is, in a direction in which the height of the top face of the piston 13 is low the cavity 25 is shallow, fuel injected from the fuel injector 23 collides at a shallow position of the cavity 25 and easily accumulates in the vicinity of the opening of the cavity 25, and a gas mixture or the flame of a burning gas mixture flows out from the cavity 25 and does not carry out combustion effectively. As in the present embodiment, by setting the fuel collision angle β in a direction in which the height of the top face of the piston 13 is low so that the angle is a right angle or an acute angle, it is possible to prevent much of the fuel that has collided with the curved wall portion 25b of the cavity 25 at the collision point b from rebounding upward toward the opening of the cavity 25, and the gas mixture or the flame is retained within the cavity 25, thus efficiently carrying out combustion.

In this way, by setting the fuel collision angle α in a direction in which the height of the top face of the piston 13 is high so that the angle is large, and preferably an obtuse angle, and setting the fuel collision angle β in a direction in which the height of the top face of the piston 13 is low so that the angle is small, and preferably an acute angle, it is possible to improve the combustion of the gas mixture in the cavity 25, improve the engine output, and reduce harmful exhaust substances.

An embodiment of the present invention is explained above, but the present invention may be modified in a variety of ways as long as the modifications do not depart from the sprit and scope thereof.

For example, in the present embodiment, the first fuel injection axis Li1 is oriented in a direction in which the height of the top face of the piston 13 is the highest, but it is not always necessary for it to be oriented in the highest direction.

Furthermore, in the present embodiment, the fuel injector 23 injects fuel in six directions spaced at intervals of 60°, but the fuel injection direction is not limited to six directions.

Moreover, in the embodiment, collision angle α>collision angle β is realized by setting the directions of all of the plurality of fuel injection axes Li1 and Li2 so as to be equal and changing the shape of the curved wall portion 25b of the cavity 25 in the circumferential direction, but collision angle α>collision angle β may be realized by setting the shape of the curved wall portion 25b of the cavity 25 so as to be equal in the circumferential direction and changing the directions of the plurality of fuel injection axes Li1 and Li2 in the circumferential direction. It is of course possible to realize collision angle α>collision angle β by changing the shape of the curved wall portion 25b of the cavity 25 in the circumferential direction and changing the directions of the plurality of fuel injection axes Li1 and Li2 in the circumferential direction. However, setting the directions of all of the plurality of fuel injection axes Li1 and Li2 so as to be equal makes it easy to machine a nozzle of the fuel injector 23 and is advantageous in terms of production cost.

The invention claimed is:

1. A direct fuel injection diesel engine comprising:
   a piston of which a height of a top face changes in a circumferential direction, the piston having a recessed cavity defined in a central part thereof by a bottom wall portion connected to a peripheral wall portion by a curved wall portion therebetween, and the piston having a piston central axis to which the curved wall portion of the piston is concave relative thereto and the bottom wall portion is oblique relative thereto, and
   a fuel injector which injects fuel oriented in a plurality of directions in the circumferential direction of an interior of the recessed cavity defined in the central part of the piston,
   wherein the peripheral wall portion of the cavity in a direction in which the height of the top face of the piston is low is inclined to open radially outward, and wherein a collision angle (α) at which fuel injected in a direction in which the height of the top face of the piston is high collides with the cavity is set larger than a collision angle (β) at which fuel injected in a direction in which the height of the top face of the piston is low collides with the cavity.

2. A direct fuel injection diesel engine comprising:
   a piston of which a height of a top face changes in a circumferential direction, the piston having a recessed cavity defined in a central part thereof by a bottom wall portion connected to a peripheral wall portion by a curved wall portion therebetween, and the piston having a piston central axis to which the curved wall portion of the piston is concave relative thereto and the bottom wall portion is oblique relative thereto, and a fuel injector which injects fuel oriented toward a plurality of positions in the circumferential direction of an interior of the cavity defined in the central part of the piston, wherein at least one of a plurality of positions is present on the curved wall portion, and wherein a collision angle ($\alpha$) at which fuel injected in a direction in which the height of the top face of the piston is high collides with the cavity is set larger than a collision angle ($\beta$) at which fuel injected in a direction in which the height of the top face of the piston is low collides with the cavity.

3. The direct fuel injection diesel engine according to claim 1 or claim 2, wherein angles formed by the plurality of fuel injection directions of the fuel injector relative to a piston central axis (Lp) are equal.

4. The direct fuel injection diesel engine according to claim 3, wherein a minimum value of the fuel collision angle in the plurality of positions is smaller than 90°.

5. The direct fuel injection diesel engine according to claim 4, wherein a maximum value of the fuel collision angle in the plurality of positions is greater than 90°.

6. The direct fuel injection diesel engine according to claim 3, wherein a maximum value of the fuel collision angle in the plurality of positions is greater than 90°.

7. The direct fuel injection diesel engine according to any one of claim 1 or claim 2, wherein a minimum value of the fuel collision angle in the plurality of positions is smaller than 90°.

8. The direct fuel injection diesel engine according to claim 7, wherein a maximum value of the fuel collision angle in the plurality of positions is greater than 90°.

9. The direct fuel injection diesel engine according to any one of claim 1 or claim 2, wherein a maximum value of the fuel collision angle in the plurality of positions is greater than 90°.

* * * * *